United States Patent [19]
Marom

[11] Patent Number: 5,738,376
[45] Date of Patent: Apr. 14, 1998

[54] AUTOMOBILE PARKING AID MECHANISM

[76] Inventor: Itshak Marom, 4 HOF Hashenhav, 34980 Haifa, Israel

[21] Appl. No.: 585,141

[22] Filed: Jan. 11, 1996

Related U.S. Application Data

[63] Continuation of Ser. No. 328,770, Oct. 27, 1994, abandoned.

[51] Int. Cl.⁶ .................................................. B60S 9/16
[52] U.S. Cl. .............................................. 280/761
[58] Field of Search .................................. 280/761, 762, 280/763.1, 764, 767; 180/199, 200, 202, 203

[56] References Cited

U.S. PATENT DOCUMENTS

| | | | |
|---|---|---|---|
| 2,358,592 | 9/1944 | Quinn | 180/199 |
| 3,011,574 | 12/1961 | Walker et al. | 180/200 X |
| 3,011,575 | 12/1961 | Bouet | 180/200 |
| 3,120,398 | 2/1964 | Butterworth | 280/761 X |
| 3,196,969 | 7/1965 | Senzani | 280/761 X |
| 4,516,653 | 5/1985 | Walker | 180/199 |
| 4,605,086 | 8/1986 | Marom | 280/767 X |

FOREIGN PATENT DOCUMENTS

| | | | |
|---|---|---|---|
| 327 370 | 8/1989 | European Pat. Off. | 180/199 |
| 857.301 | 9/1940 | France | 180/202 |
| 1.283.968 | 1/1962 | France | 180/202 |
| 60-255550 | 12/1985 | Japan | 180/200 |
| 532868 | 2/1941 | United Kingdom | 180/200 |

*Primary Examiner*—Kevin Hurley
*Attorney, Agent, or Firm*—Mark M. Friedman

[57] ABSTRACT

A mechanism for improving the parking of an automobile. The mechanism includes an arm whose upper end is rotatably fixedly connected to the automobile chassis or undercarriage at a location which, in the case of a front wheel drive vehicle, is roughly between the two rear wheels. The axis of rotation of the arm is permanently angled to the rear axle so as to intersect either the right or left front wheels. The mechanism includes one or more passive auxiliary wheels connected to the lower end of the arm. The orientation of the axes of rotation of the passive auxiliary wheels is substantially parallel to the axis of rotation of the arm. The mechanism further includes a mechanism for rotating the arm so as to cause the passive auxiliary wheels to first contact the ground and then lift the rear wheels off the ground to allow the automobile to be maneuvered and parked when the automobile is driven forwards or backwards.

17 Claims, 3 Drawing Sheets

AUTOMOBILE PARKING AID MECHANISM

This is a continuation of U.S. patent application Ser. No. 08/328,770, filed Oct. 27, 1994, now abandoned.

FIELD AND BACKGROUND OF THE INVENTION

The present invention relates to automobiles and, more particularly, to mechanisms for enabling an automobile to maneuver and to park easily in a relatively short, or tight, parking space.

The increasing congestion in today's large cities, with the resultant scarcity of parking spaces, have provided the motivation for development of a wide variety of mechanisms for enabling an automobile to be parked in a parking space which is relatively small, i.e., not much longer than the overall length of the automobile.

Each of the proposed mechanisms of which the inventor of the present invention is aware suffers from one or more serious shortcomings which make the mechanism commercially unattractive. Indeed, to date, no mechanism for improving the parking of an automobile has gained widespread use.

There is thus a widely recognized need for, and it would be highly advantageous to have, a mechanism for improving the parking of an automobile in a parking space which has advantages over previously known systems and which, in particular, is effective, inexpensive and reliable.

SUMMARY OF THE INVENTION

According to the present invention there is provided a mechanism for improving the maneuvering of an automobile having a first pair of automobile wheels and a second powered pair of automobile wheels, such as during maneuvering, comprising: (a) an arm having an upper end and a lower end, the upper end being rotatably fixedly connected to the automobile at a location substantially intermediate between the first pair of automobile wheels, the axis of rotation of the arm being permanently substantially angled to a line connecting the centers of the wheels of the first pair of wheels so as to intersect a line connecting the centers of the wheels of the second pair of wheels at or near one or the other of the second pair of automobile wheels; (b) at least one passive auxiliary wheel connected to the lower end of the arm, the axis of rotation of the at least one passive auxiliary wheel being substantially parallel to the axis of rotation of the upper end of the arm; and (c) an arm rotating mechanism for rotating the arm so as to cause the at least one passive auxiliary wheel to first contact the ground and then lift the first pair of automobile wheels off the ground.

According to further features in preferred embodiments of the invention described below, the arm rotating mechanism includes a hydraulic piston which is driven by the power steering hydraulic pump.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an automobile parking aid mechanism which can be used to enable an automobile to perform parking in parking spaces.

The principles and operation of a mechanism according to the present invention may be better understood with reference to the drawings and the accompanying description.

Figure 1A:
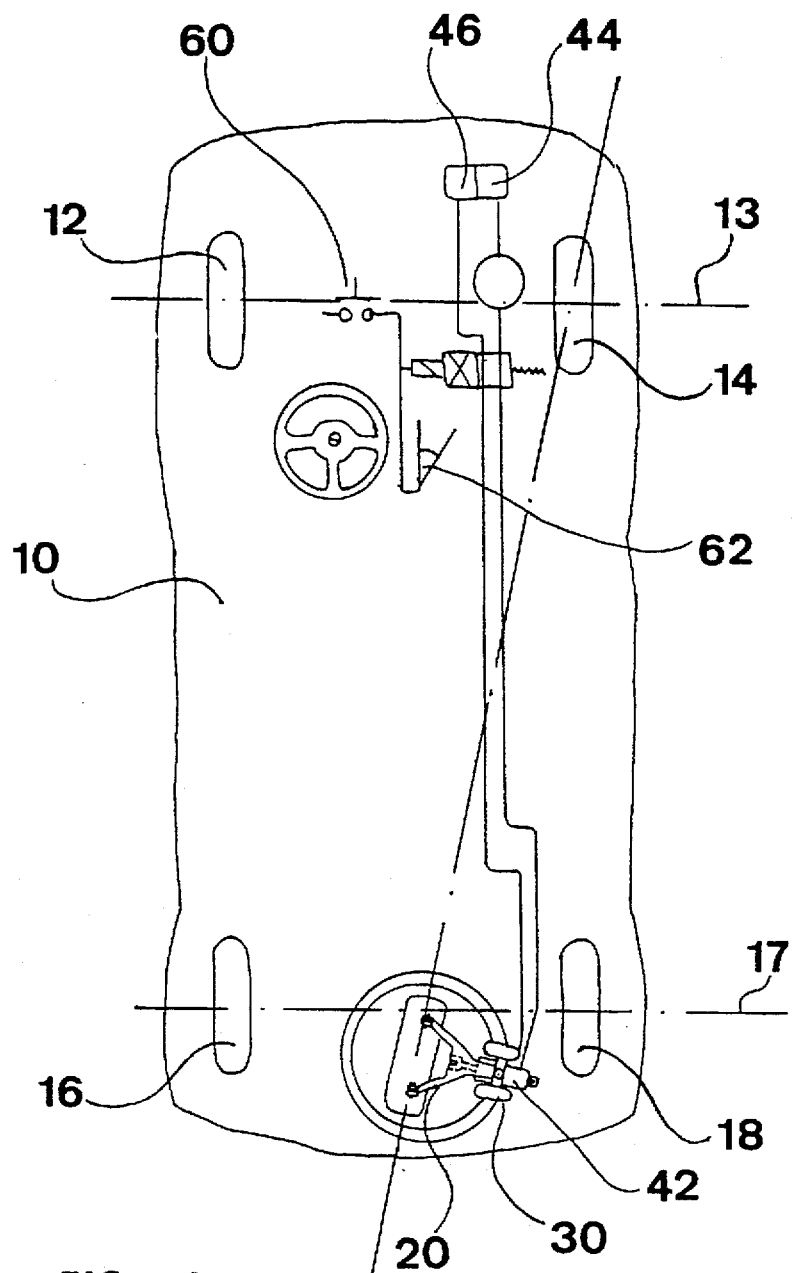
FIG. 1A is a schematic top view of an automobile equipped with a parking mechanism according to the present invention.
Figure 1B:
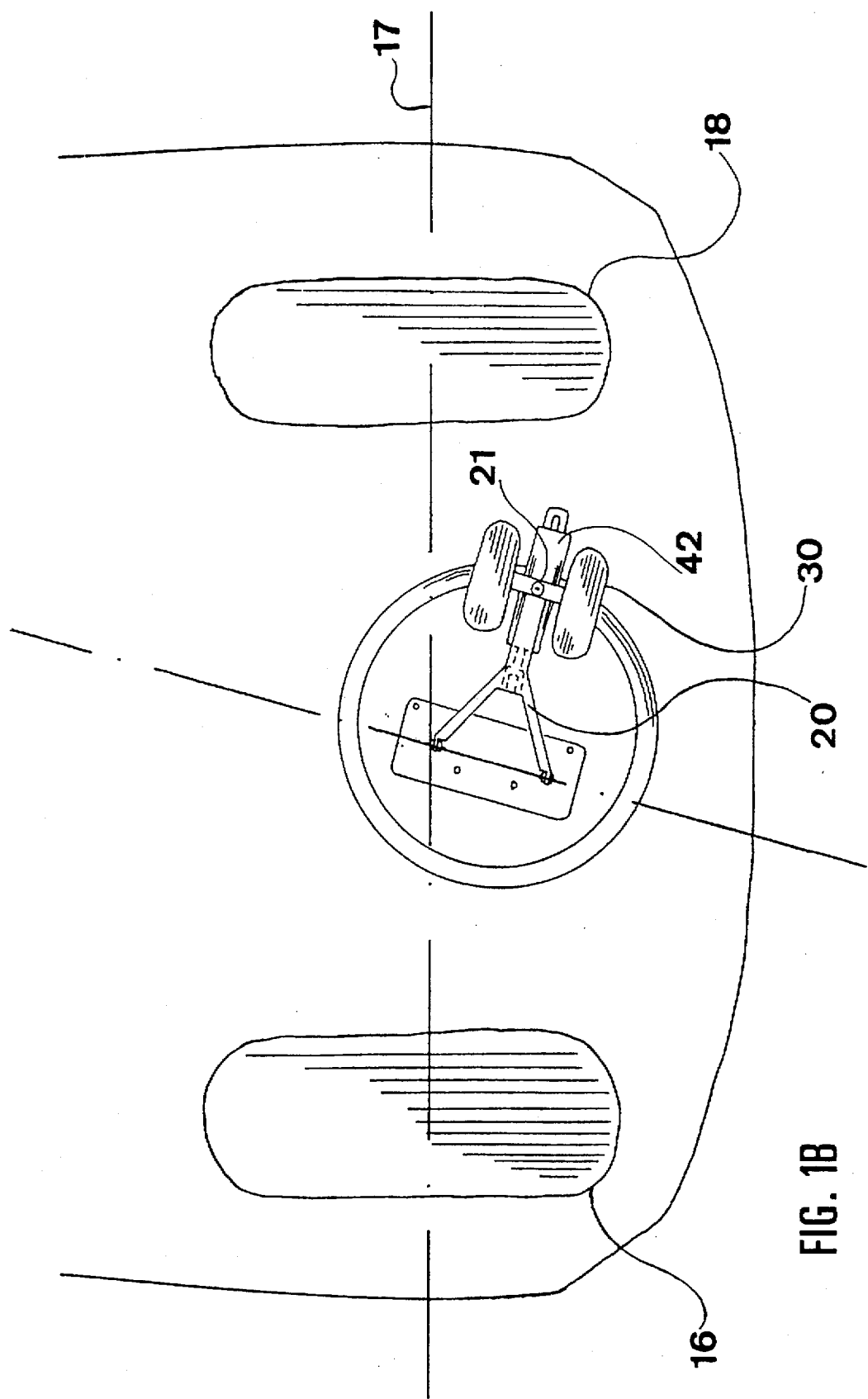
FIG. 1B is a close-up view of a portion of the automobile of FIG. 1A showing a parking mechanism according to the present invention.

Referring now to the drawings, FIGS. 1A and 1B illustrate an automobile 10 equipped with a mechanism according to the present invention for improving the maneuvering of an automobile, especially during parking. Automobile 10 has four wheels arranged in two pairs of wheels 12, 14 and 16, 18.

A mechanism according to the present invention can be usefully employed with automobiles featuring either front wheel or rear wheel drive. The description which follows related to FIGS. 1A and 1B which depict an automobile with front wheel drive.

A mechanism according to the present invention includes an arm 20 of any suitable shape. The upper end of arm 20 is rotatably fixedly connected to the chassis or undercarriage of automobile 10 in some suitable fashion. The connection point is substantially intermediate between a pair of automobile wheels (the rear wheels 16 and 18 in the case of FIGS. 1A and 1B).

Figure 3:
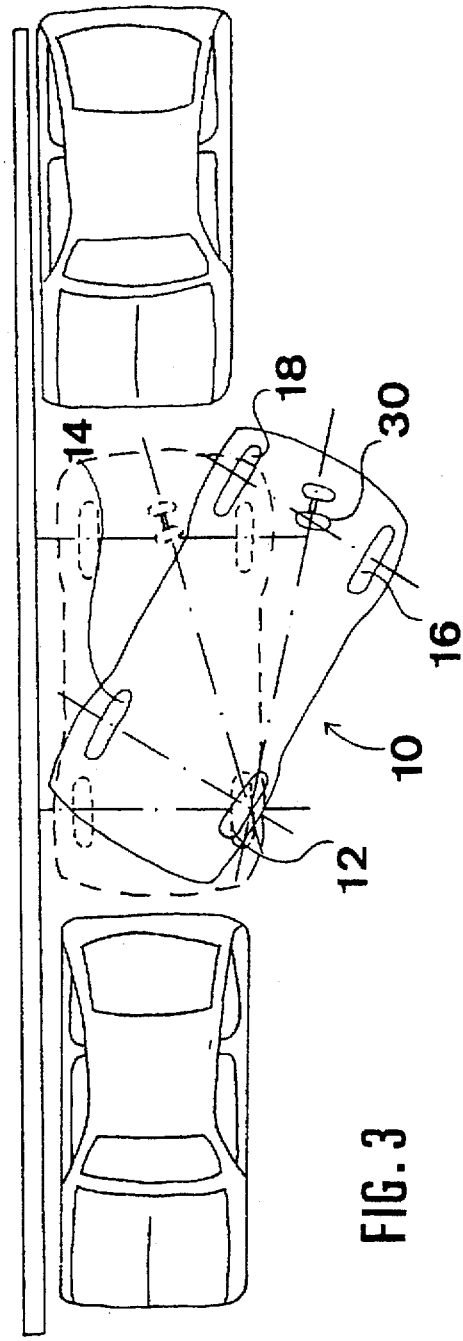
FIG. 3 is a top view showing an automobile equipped with a parking mechanism according to the present invention as it maneuvers into a parking space.

The connection between arm 20 and automobile 10 is such that the axis of rotation of arm 20 is permanently angled to the rear axle 17 in such a way as to intersect the front axle 13 at or near one or the other of the wheels (the front right wheel 14 in the case of FIGS. 1A and 1B, the front left wheel 12 in the case of FIG. 3).

The lower end of arm 20 carries one or more, preferably two, passive auxiliary wheels 30. Auxiliary wheels 30 are connected to arm 20 so that the axis of rotation of auxiliary wheels 30 is substantially parallel to the axis of rotation of upper end of arm 20. Preferably, auxiliary wheels 30 are connected to arm 20 via a suitable joint 21 (FIG. 1B), such a spherical bearing, to give wheel 30 the ability to adjust its orientation slightly to accommodate non-ideal pavement contours and the like.

A mechanism according to the present invention further includes a hydraulic mechanism 40 for rotating arm 20 so as to cause auxiliary wheels 30 to first contact the ground and then, upon further rotation, to lift the adjacent pair of automobile wheels off the ground so that at least a portion of the automobile is supported by auxiliary wheels 30.

Preferably, hydraulic mechanism 40 includes a hydraulic piston 42 which is driven by a hydraulic pump 44 which may be a dedicated pump powered by an electric motor 46 but which is preferably the same hydraulic pump used in the power steering system.

Figure 2:
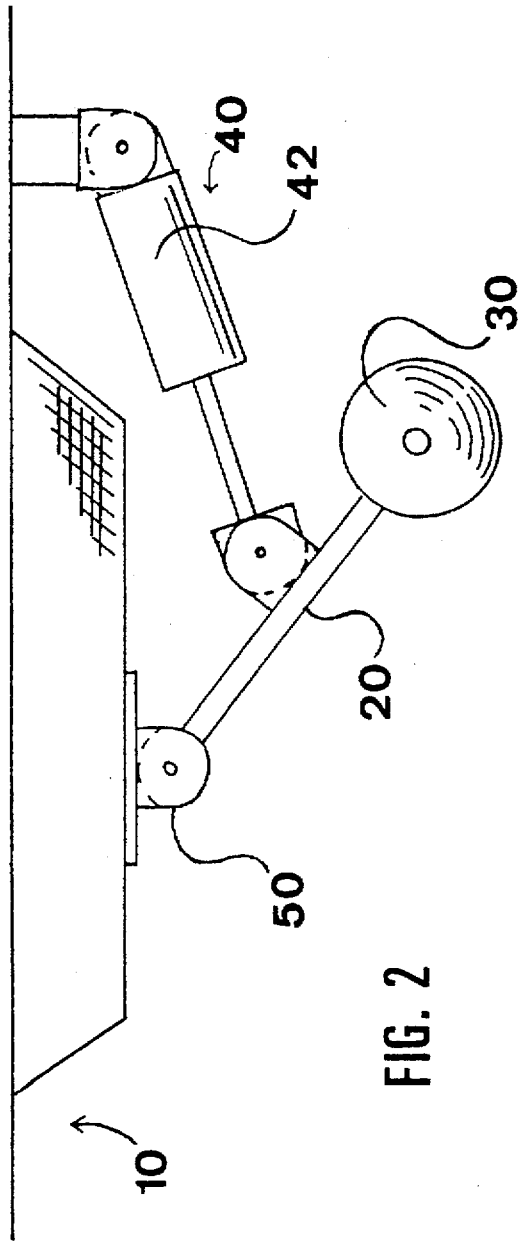
FIG. 2 is a side view of a mechanism according to the present invention as it appears when deployed.

A mechanism according to the present invention further includes a retracting mechanism for rotating arm 20 so as to cause auxiliary wheels 30 to move upward (counterclockwise in FIG. 2) so as to cease contact with the ground and move toward a stowed position close to the automobile chassis or undercarriage. The retracting mechanism can be a suitable biasing mechanism, such as torsion spring 50, or the hydraulic mechanism 40 which can operate in either sense.

Preferably, the activation of the arm 20 so as to engage auxiliary wheels 30 is carried out using a suitable switch 60 located on or near the dashboard. Most preferably, the activation cannot take place except when the car is stationary, for example, when the hand brake 62 is engaged. This prevents the undesirable situation that switch 60 is inadvertently activated while the car is travelling on its four wheels.

With reference to FIG. 3, in operation, a mechanism according to the present invention would operate as follows. The driver would spot a parking space. The driver would then enter the parking space by driving its front end into the space with the front wheels 12 and 14 directed straight ahead. The position of the automobile at this point is shown by the solid lines in FIG. 3. At this point the driver would activate the mechanism to cause auxiliary wheels 30 to be lowered to their operative position, raising rear wheels 16 and 18 off the pavement.

In the mechanism depicted in FIG. 3, the axis of rotation of arm 20 (not shown in FIG. 3) is oriented so that its axis of rotation intersects the front left wheel 12.

At this point, the driver would allow the automobile to be driven forward, i.e., without turning the steering wheel. However, because the rear wheels 16 and 18 are now off the ground and the rear portion of the automobile is supported by auxiliary wheels 30 which are angled as described above, the forward movement of the automobile drive wheels 12 and 14 will cause the vehicle to rotate so as to produce a large lateral movement of the rear end during a short forward movement of the front end, thereby enabling the vehicle to enter the parking space as depicted by the dashed lines in FIG. 3. In effect, the automobile is rotated about its left front wheel 12 which remains stationary while its right front wheel 14 pulls forward.

The differential movement of the two front wheels is made possible by differential transmission which is a standard features of automobile drive system and which makes it possible for the automobile to turn.

Leaving the parking space requires a similar procedure, except that the car is driving in reverse.

While the invention has been described with respect to a limited number of embodiments, it will be appreciated that many variations, modifications and other applications of the invention may be made.

What is claimed is:

1. An automobile of improved maneuvering capability, such as during parking, comprising:
   (a) a first pair of automobile wheels;
   (b) a second powered pair of automobile wheels; and
   (c) a single mechanism for improving maneuverability of the automobile, said mechanism including:
      (i) an arm having an upper end and a lower end, said upper end being rotatably fixedly connectable to the automobile at a location substantially intermediate between said first pair of automobile wheels, the axis of rotation of said arm being permanently substantially angled to a line connecting the centers of said wheels of said first pair of wheels so as to intersect a line connecting the centers of said wheels of said second pair of wheels at or near one or the other of said second pair of automobile wheels;
      (ii) at least one passive auxiliary wheel connected to said lower end of said arm, the axis of rotation of said at least one passive auxiliary wheel being substantially parallel to the axis of rotation of said upper end of said arm; and
      (iii) an arm rotating mechanism for rotating said arm so as to cause said at least one passive auxiliary wheel to first contact the ground and then lift the first pair of automobile wheels off the ground.

2. An automobile as in claim 1, wherein said arm rotating mechanism includes a hydraulic piston.

3. An automobile as in claim 2, wherein said hydraulic piston is driven by a hydraulic pump.

4. An automobile as in claim 3, wherein said hydraulic pump is powered by an electric motor.

5. An automobile as in claim 3, wherein said hydraulic pump is a power steering hydraulic pump.

6. An automobile as in claim 1, wherein said the first pair of automobile wheels are the rear wheels of the automobile and the automobile is a front wheel drive vehicle.

7. An automobile as in claim 6, wherein the axis of rotation of said arm is oriented so as to intersect the right front automobile wheel.

8. An automobile as in claim 6, wherein the axis of rotation of said arm is oriented so as to intersect the left front automobile wheel.

9. An automobile as in claim 1, wherein said at least one passive auxiliary wheel is a pair of auxiliary wheels.

10. An automobile as in claim 9, wherein said pair of auxiliary wheels is connected to said lower end of said arm via a joint.

11. An automobile as in claim 10, wherein said joint is a spherical bearing.

12. An automobile as in claim 1, further composing a retracting mechanism for rotating said arm so as to cause said at least one passive auxiliary wheel to move upward so as to cease contact with the ground.

13. An automobile as in claim 12, wherein retracting mechanism includes a spring.

14. An automobile as in claim 12, wherein said retracting mechanism is said hydraulic mechanism.

15. An automobile as in claim 1, wherein said upper end of said arm is connected to the automobile chassis.

16. An automobile as in claim 1, wherein said upper end of said arm is connected to the automobile undercarriage.

17. An automobile as in claim 1, wherein said hydraulic mechanism for rotating said arm so as to cause said at least one passive auxiliary wheel to first contact the ground and then lift said first pair of automobile wheels off the ground is activatable only when a hand brake of the automobile is engaged.

* * * * *